(12) United States Patent
Johnson (10) Patent No.: US 7,535,925 B2
(45) Date of Patent: May 19, 2009

(54) BROADBAND WIRELESS COMMUNICATION SYSTEM

(75) Inventor: Harold W. Johnson, Roach, MO (US)

(73) Assignee: Sprint Communications Company LP, Overland Park, KS (US)

( * ) Notice: Subject to any disclaimer, the term of this patent is extended or adjusted under 35 U.S.C. 154(b) by 43 days.

(21) Appl. No.: 11/369,069

(22) Filed: Mar. 6, 2006

(65) Prior Publication Data

US 2006/0160554 A1 Jul. 20, 2006

Related U.S. Application Data

(63) Continuation of application No. 09/304,879, filed on May 4, 1999, now Pat. No. 7,042,905.

(51) Int. Cl.
*H04J 3/16* (2006.01)
(52) U.S. Cl. ........................ 370/468; 370/230; 370/329
(58) Field of Classification Search ............. 370/310.1, 370/310.2, 468, 230, 252, 329, 352, 401
See application file for complete search history.

(56) References Cited

U.S. PATENT DOCUMENTS 5,638,371 A * 6/1997 Raychaudhuri et al. .. 370/310.2
6,324,184 B1 * 11/2001 Hou et al. ................... 370/468

* cited by examiner

*Primary Examiner*—Quochien B Vuong (57) ABSTRACT

A wireless communication system and its method of operation are disclosed. The wireless communication system comprises a subscriber system and a base station system. The subscriber system transfers a request for a communication service comprising a voice communication or web browsing. The base station system receives the request and receives traffic information for the wireless communication system. The base station selects a frame format for packets for the requested communication service based on the delivery requirements of the requested communication service and based on the traffic information. The base station system transfers an instruction to the subscriber system indicating the selected frame format for the packets. The subscriber system exchanges the packets for the requested communication service using the selected frame format with the base station system over a wireless communication link. The base station system exchanges the packets with a telephony network system or an internet system.

20 Claims, 9 Drawing Sheets

BROADBAND WIRELESS COMMUNICATION SYSTEM

RELATED APPLICATIONS

This patent application is a continuation of U.S. patent application Ser. No. 09/304,879; filed on May 4, 1999; now U.S. Pat. No. 7,042,905 entitled "Broadband Wireless Communication System;" and hereby incorporated by reference into this patent application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a broadband wireless communication system.

2. Description of the Prior Art

In the past, wireless communications solved problems of time and cost expense in providing telecommunication services to the end user. However, a wireless solution traditionally has been limited to specific service applications such as radio broadcast or wireless telephony. Both wired and wireless capacity would be allocated based on the traffic patterns. Spectral bearer channel allocations would be rearranged based on a demand pattern matched to traffic patterns. The numerous delivery requirements of different telecommunication services make providing a host of services over wireless communications a difficult task. Recently with the proliferation of the Internet, new types of communications have been added to the array of communication services offered to consumers. Relatively new Internet applications such as web browsing, chat rooms, and PUSH technology have joined e-mail and bulletin boards as conventional communication services.

With each new communication service, a new challenge arises due to a new set of delivery requirements that usually differ from delivery requirements of other communication services. The delivery requirements describe the characteristics which control how communication services are provided to the consumer. Certain services such as video and audio are time dependent, while e-mail and text are not. Telephone conversations and web browsing require delivery in real time, while video mail can be observed at a later point. Another delivery requirement is quality of service. Voice communications can have some errors or static and still be understood by the listener. On the other hand, downloading a computer program must be error free. Other delivery requirements include traffic pattern, bandwidth, priority, and grade of service. New communication services will bring about needs for new kinds of delivery requirements.

Providing a wired solution to every residence and business can be costly and time consuming. Also, current wired solutions may not have the speed and capacity to handle new communication services. For example, the emergence of the Internet and more specifically the World Wide Web has brought about the need for dedicated computer lines such as ISDN lines in order to bypass speed and capacity restrictions of telephone lines. Telephone lines could support new video cameras linked to people's Internet home pages, but the result would be too slow. Other wired solutions could use current cable wires in residential homes, but cable companies may be reluctant to enter new markets by offering a host of communication services for various business reasons.

SUMMARY OF THE INVENTION

Examples of the invention include a wireless communication system and its method of operation. The wireless communication system comprises a subscriber system and a base station system. The subscriber system transfers a request for a communication service comprising one of a voice communication and web browsing. The requested communication service has delivery requirements. The base station system receives the request and receives traffic information for the wireless communication system. The base station selects a frame format for packets for the requested communication service based on the delivery requirements of the requested communication service and based on the traffic information for the wireless communication system. The base station transfers an instruction indicating the selected frame format for the packets for the requested communication service. The subscriber system receives the instruction indicating the selected frame format for the packets for the requested communication service, and in response, exchanges the packets for the requested communication service using the selected frame format with the base station system over a wireless communication link. The base station system exchanges the packets for the requested communication service using the selected frame format with the subscriber system over the wireless communication link. The base station system exchanges the packets for the requested communication service with one of a telephony network system and an internet system.

In some examples of the invention, the request for the communication service indicates a telephone number and an internet address.

In some examples of the invention, the request for the communication service indicates a priority.

In some examples of the invention, the request for the communication service indicates a user profile.

In some examples of the invention, the subscriber system is portable.

In some examples of the invention, the delivery requirements include a real-time delivery requirement.

In some examples of the invention, the delivery requirements include a bandwidth delivery requirement.

In some examples of the invention, the delivery requirements include a delay delivery requirement.

In some examples of the invention, the packets comprise voice packets.

In some examples of the invention, the telephony network system comprises a Plain Old Telephone System (POTS).

DETAILED DESCRIPTION OF THE PREFERRED EMBODIMENT

Figure 1:
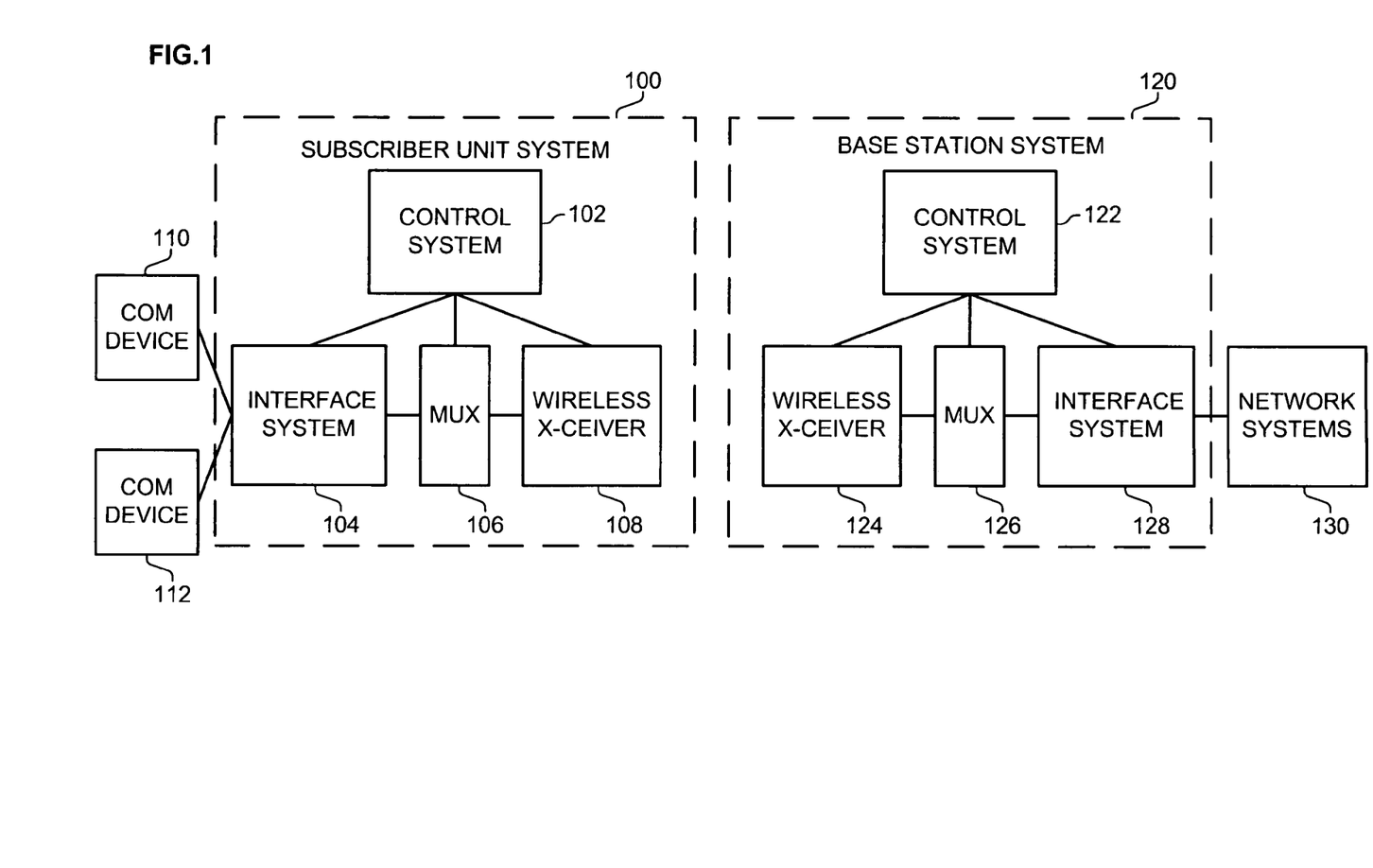
FIG. 1 is a system-level block diagram in an example of the invention.
Figure 2:
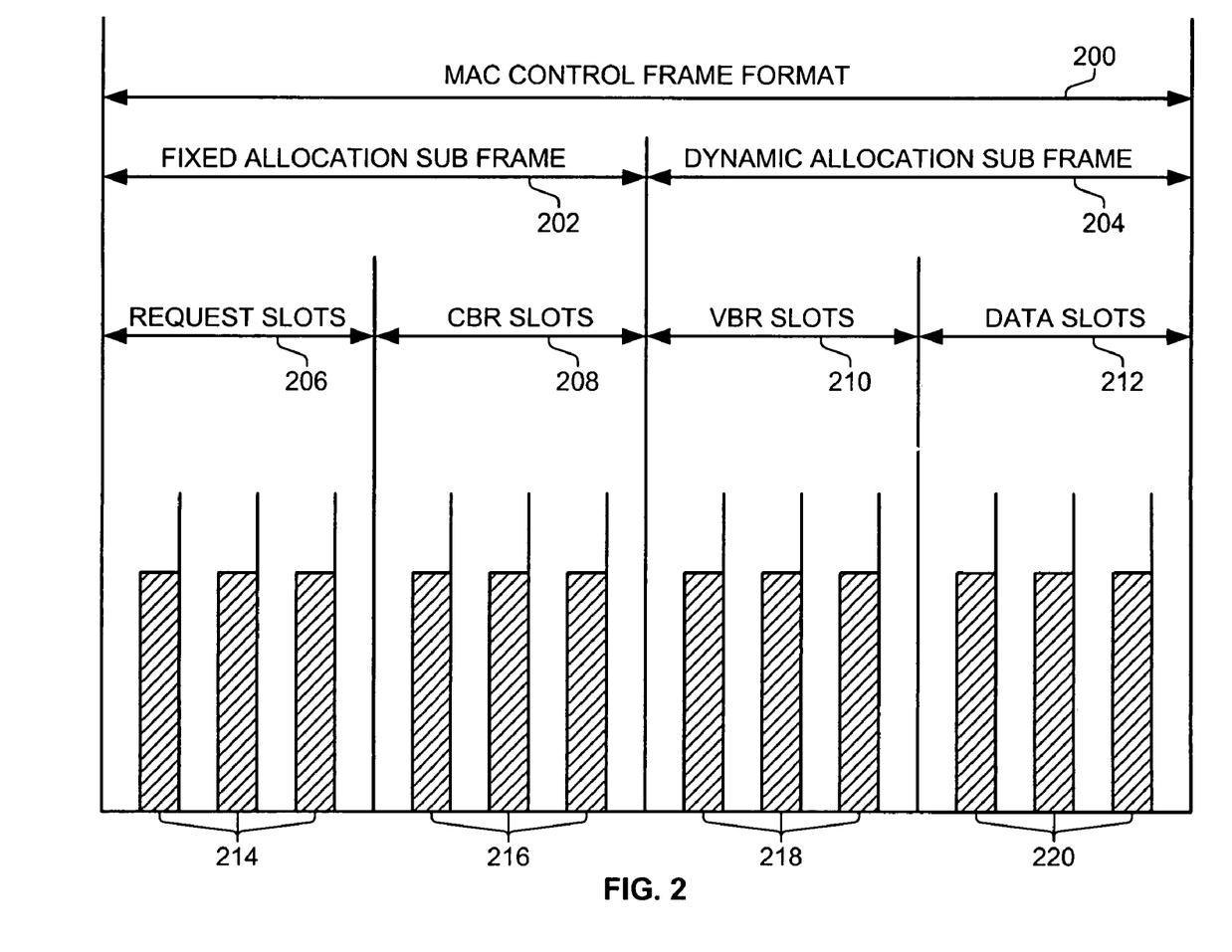
FIG. 2 depicts a media access control (MAC) frame format in a MAC layer in an example of the invention.

System Configuration and Operation—FIGS. 1-2

FIG. 1 discloses a broadband wireless access system comprised of a subscriber unit system 100 and a base station system 120. The subscriber unit system 100 is comprised of a subscriber control system 102, a communication interface system 104, a MUX 106, and a subscriber wireless transceiver 108. The subscriber control system 102 is connected to the communication interface system 104, the MUX 106, and the subscriber wireless transceiver 108. A communication device 110 and a communication device 112 are connected to the communication interface system 104. The MUX 106 is connected to the communication interface system 104 and the subscriber wireless transceiver 108.

The base station system 120 is comprised of a connection admission control system 122 (CAC), a base wireless transceiver 124, a MUX 126, and a network interface system 128. The CAC 122 is connected with the base wireless transceiver 124, the MUX 110, and the network interface system 128. The base wireless transceiver 124 is connected to the MUX 126. The network interface system 128 is connected to the MUX 126 and network systems 130. The subscriber wireless transceiver 108 communicates with the base wireless transceiver 124 through wireless communications.

The communication service could mean any service provided to a subscriber in which the subscriber unit system 100 exchanges information with another device or person. Some examples of communication services are voice communications, FAX communications, audio broadcasts, pay-per-view video broadcasts, web browsing, transferring data files, and e-mail. The communication devices 110 and 112 could be any device that transfers or receives information such as voice or data. Some examples of communications devices are telephones, cellular telephones, fax machines, answering machines, private branch exchange, computers, personal LANs, stereos, and televisions.

The communication interface system 104 could be any device that receives requests for communication service from the communication devices 110 and 112, transmits requests for communication service to the MUX 106, receives control information from the subscriber control system 102, and exchanges communication services between the communication devices 110 and 112 and the MUX 106. The communication interface system 104 could be a voice interface that acts as a POTS interface, supervises signals, channels voice lines, or resolves contention between voice lines. The communication interface system 104 could also be a data interface that manages data stream, performs asynchronous time division, or concentrates data lines.

The MUX 106 could be any conventional multiplexer that receives and transmits communication service requests from the communication interface system 104 to the subscriber wireless transceiver 108, receives control information from the subscriber control system 102, and exchanges communication services between the communication interface system 104 and the subscriber wireless transceiver 108. The MUX 106 typically is an electronic device which passes a plurality of signals over one communications circuit.

The subscriber wireless transceiver 108 could be any conventional transceiver that receives and transmits communication service requests from the MUX 106 to the base wireless transceiver 124, receives control information from the subscriber control system 102, and exchanges communication services between the MUX 106 and the base wireless transceiver 124. The term "wireless transceiver" could mean any device or plurality of devices that transmits and/or receives transmissions without the use of wires.

The subscriber control system 102 communicates with the connection admission control system 122 to coordinate the operation of the communication interface system 104, the MUX 106, and the subscriber wireless transceiver 108. The subscriber control system 102 requests and receives instructions to manage the dynamically configured MAC layer. Those skilled in the art may appreciate that the subscriber control system 102 may be distributed within the communication interface system 104, the MUX 106, and the subscriber wireless transceiver 108.

The base wireless transceiver 124 could be any conventional transceiver that receives and transmits communication service requests from the subscriber wireless transceiver 108 to the MUX 126, receives control information from the CAC 122, and exchanges communication services between the subscriber wireless transceiver 108 and the MUX 126.

The MUX 126 could be any conventional multiplexer that receives and transmits communication service requests from the base wireless transceiver 124 to the network interface system 128, receives control information from the CAC 122, and exchanges communication services between the base wireless transceiver 124 and the network interface system 128. The MUX 126 typically is an electronic device which passes a plurality of signals over one communications circuit.

The network interface system 128 could be any device or plurality of devices that receives and transmits communication service requests from the MUX 126 to the CAC 122 and exchanges communication services between the MUX 126 and the network systems 130. The network interface system 128 could perform POTS line concentration or manage ATD or packet data stream.

The network systems 130 could be any system or plurality of systems that bill, authorize, or exchange communication services with the network interface system 128. Some examples of networks systems 130 are public internet servers, private corporate intranet servers, video programming systems, multimedia network servers, and POTS servers.

The connection admission control system 122 could be any computer processing platform that: 1) receives a request for a communication service over a wireless transmission link, 2) in response to receiving the request, dynamically configures a media access control layer in a wireless transmission link for the requested communication service, and 3) generates and transmits an instruction to provide the requested communication service over the wireless transmission link using the dynamically configured media access control layer.

FIG. 2 depicts a media access control (MAC) frame format in a MAC layer for one embodiment of the invention. A MAC control frame format (MAC frame) 200 is comprised of a fixed allocation sub frame 202 and a dynamic allocation sub frame 204. The fixed allocation sub frame 202 has requests slots 206 and constant bit rate slots 208. The dynamic allocation sub frame 204 has variable bit rate slots 210 and data slots 212. Each slot will contain packets of information. Each packet of information is in a certain position of the MAC frame 200. A section of the MAC frame format comprises of a group of positions in the MAC frame 200.

Reservation information 214 is placed in the request slots 206. Reservation information 214 is control information for the communication service. Some examples of reservation information are user profile of authorized services, capacity parameters based on service priorities, service prioritization table, and system user ID correlation to service addresses (ex. IP address and phone numbers). In one embodiment of the invention, voice packets 216 are positioned in CBR slots 208 by circuit mode reservation. VBR packets 218 are placed in VBR slots 210 by using a statistical multiplexing algorithm where available capacity is allocated among demands based on usage parameters declared during call set-up. Data packets 220 are placed in the data slots 212 by using a first-come-first-serve queuing method. Those skilled in the art will understand the various queuing methods that could be used to reserve packets in the slots. Other examples of queuing methods are fair queuing, burst servicing policies, and time of expiry queuing.

Those skilled in the art can appreciate an error checking structure in order to prevent errors in error free communications such as file downloading and e-mail. The error checking structure can include sequence numbers or the equivalent to detect if a packet received has been corrupted in which case retransmission can be requested.

Figure 3:
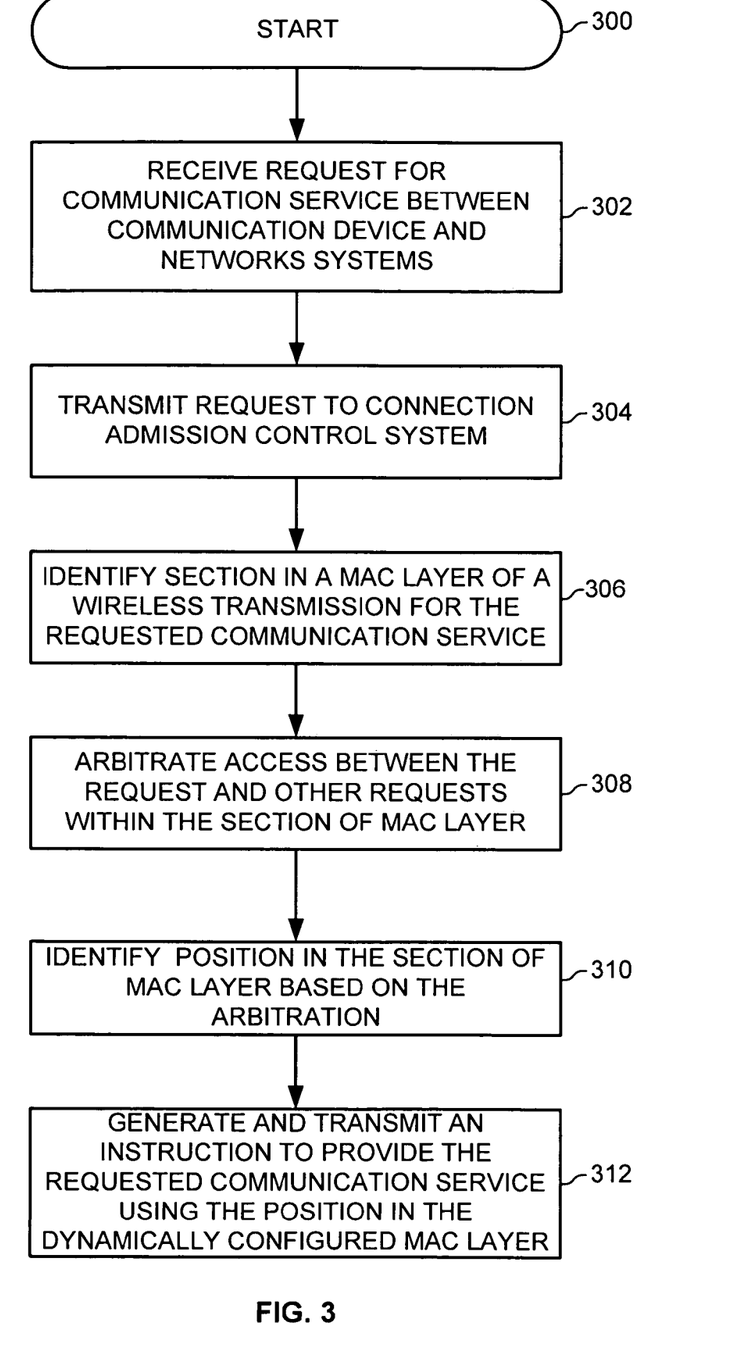
FIG. 3 depicts a flow chart for providing communication service in an example of the invention.

FIG. 3 depicts a flow chart for providing communication service in the broadband wireless access system. The flow chart begins in step 300. In step 302, the communications interface system 104 receives a request from the communication device 110 for communication service with network element systems 130. The communication interface system 104 transmits the request for communication service to the CAC 122 via the MUX 106, the subscriber wireless transceiver 108, the base wireless transceiver 124, and the MUX 126 in step 304. Those skilled in the art will appreciate that the communication service request can originate from the network systems 130 and can be transmitted to the CAC 122 via the network interface system 128 and the MUX 126. For example, the network systems 130 may have an incoming call for the communication device 110.

In response to receiving the request, the CAC 122 identifies a section in the MAC layer of a wireless transmission for the requested communication service in step 306. In step 308, the CAC 122 then arbitrates access between the request and other requests for communication services within the section of the MAC layer identified in step 306. In step 310, the CAC 122 then identifies a position in the section of the MAC layer for the requested communication service based on the arbitration in step 308. The CAC 122 dynamically configures the MAC layer for the requested communication service in steps 306-310. Steps 306-310 may be based on the delivery requirements of the communication service. Some examples of the delivery requirements are time dependency, need for real time communication, quality of service, traffic pattern, bandwidth, priority, and grade of service.

The CAC 122 generates an instruction to provide the communication service using the position in the dynamically configured MAC layer. The CAC 122 then transmits the instruction for the MUX 126 and the MUX 106 to coordinate the provision of the communication service. In alternative embodiments, the CAC 122 may also transmit the instruction to the subscriber control system 102, the interface system 104, and/or the interface system 128. The communication service is then provided between the network system 130 and the communication device 110 through the network interface system 128, the MUX 126, the base wireless transceiver 124, the subscriber wireless transceiver 108, the MUX 106, and the communication interface system 104. Once the communication service concludes, the session terminates connections and wireless capacity tears down in reverse order ending the session.

Broadband Wireless Communication System—FIGS. 4-9

FIGS. 4-9 disclose one embodiment of the invention, but the invention is not restricted to the configuration provided below. Those skilled in the art will appreciate numerous variations in broadband wireless system configuration and operation that are within the scope of the invention. Those skilled in the art will also appreciate how the principles illustrated in this example can be used in other examples of the invention. A particular reference number in one figure refers to the same element in all of the other figures.

Figure 4:
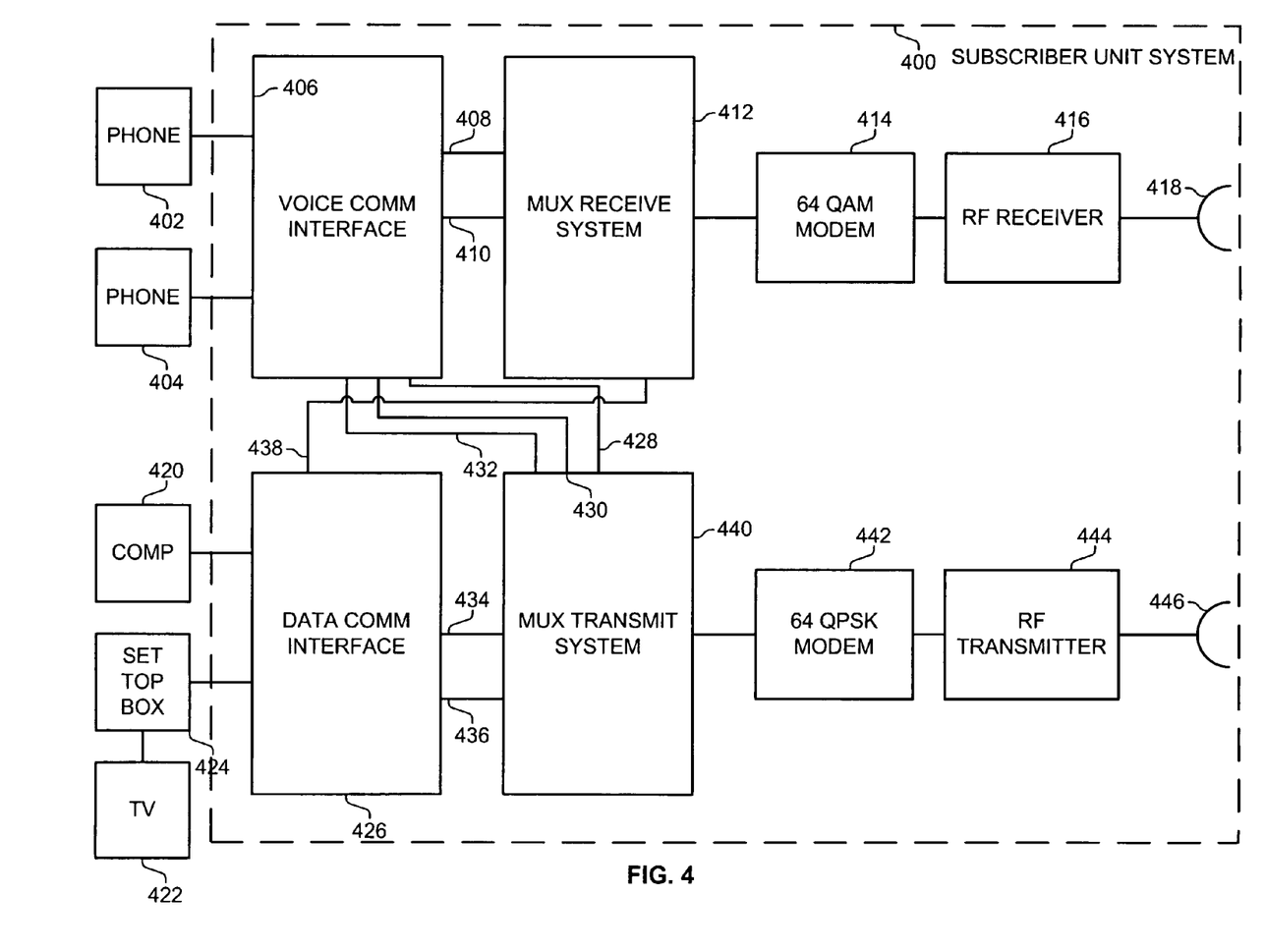
FIG. 4 is a block diagram of a subscriber unit system in an example of the invention.

FIG. 4 depicts a subscriber unit system 400. The subscriber unit system 400 is comprised of a voice communication interface (VCI) 406, a MUX receive system 412, a 64 QAM modem 414, an RF receiver 416, an antenna 418, a data communication interface (DCI) 426, a MUX transmit system 440, a QPSK modem 442, a RF transmitter 444, and an antenna 446. A telephone 402 and a telephone 404 are connected to the voice communication interface 406. The VCI 406 is coupled to the MUX receive system 412 by a signal link 408 and a downstream voice link 410. The MUX receive system 412 is connected to the 64 QAM modem 414. The RF receiver 416 is connected to the 64 QAM modem 414 and the antenna 418.

A computer 420 and a set top box 424 are connected to the DCI 426. A television 422 is connected to the set top box 424. The DCI 426 is connected to the MUX receive system by a downstream data link 438. The DCI 426 is coupled to the MUX transmit system 440 by an upstream data link 436 and a MAC layer link 434. The VCI 406 is connected to the MUX transmit system by an upstream voice link 428, an upstream signal link 430, and a MAC layer link 432. The MUX transmit system is connected to the QPSK modem 442. The RF transmitter 444 is connected to the QPSK modem 442 and the antenna 446.

Figure 5:
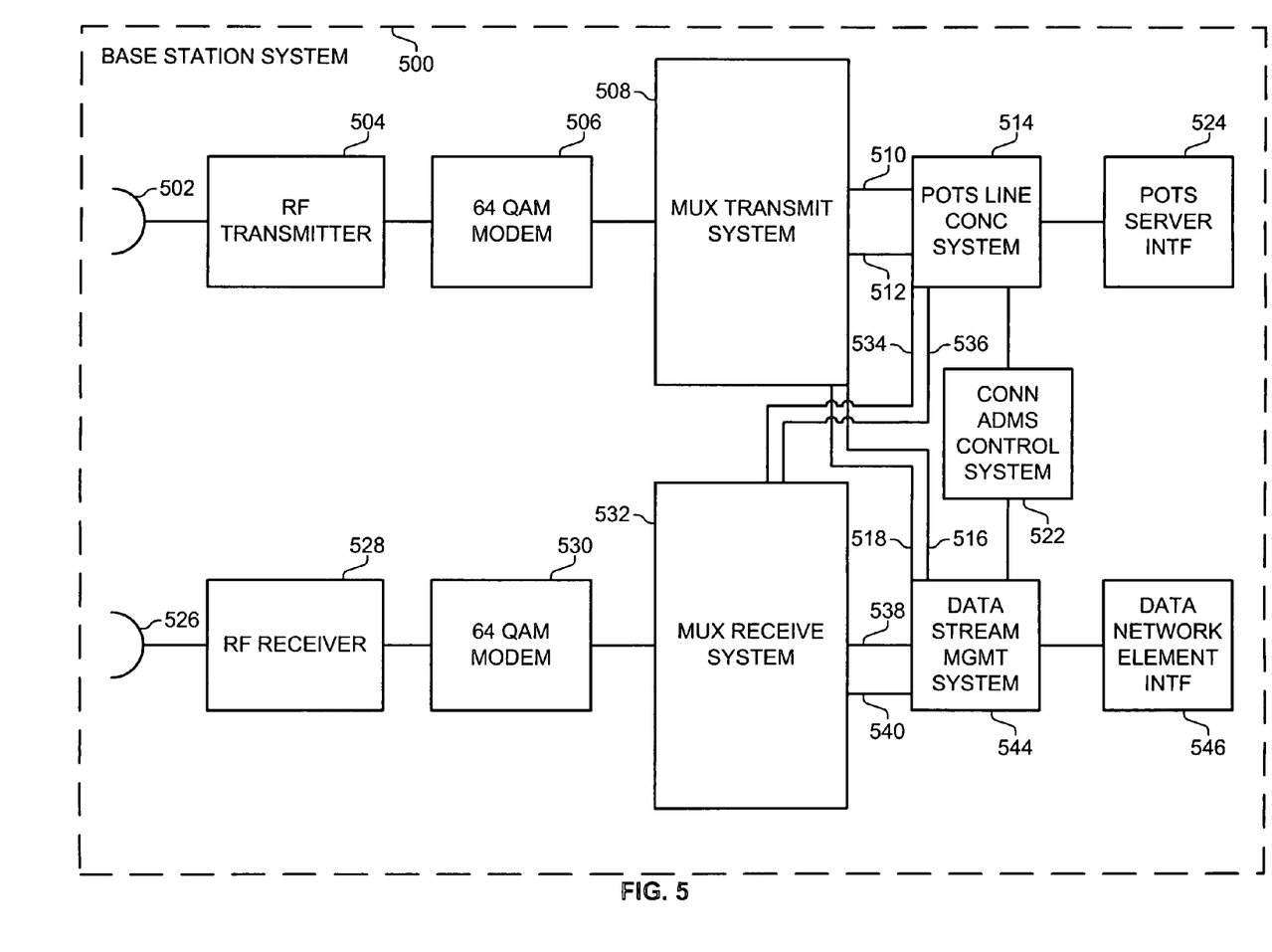
FIG. 5 is a block diagram of a base unit system in an example of the invention.

FIG. 5 depicts a base station system 500. The base station system 500 is comprised of an antenna 502, an RF transmitter 504, a 64 QAM modem 506, a MUX transmit system 508, a POTS line concentration system (POTS LCS) 514, a connection admission control system (CAC) 522, an antenna 526, an RF receiver 528, a 64 QAM modem 530, a MUX receive system 532, a data stream management system (DSM) 544, a POTS server interface (POTS SI) 524, and a data network element interface (DNE) 546. The RF transmitter 504 is connected to the antenna 502 and the 64 QAM modem 506. The 64 QAM modem 506 is connected to the MUX transmit system 508. The MUX transmit system 508 is coupled to the POTS LCS 514 by an upstream voice link 510 and an upstream signal link 512. The POTS SI 524 is connected to the POTS LCS 514.

The connection admission control system 522 is connected to the POTS LCS 514 and the DSM 544. The RF receiver 528 is connected to the antenna 526 and the 64 QAM modem 530. The 64 QAM modem 530 is connected with the MUX receive system 532. The MUX receive system 532 is connected with the POTS LCS 514 by a downstream voice link 534 and a downstream signal link 536. The MUX receive system 532 is also connected to the DSM 544 by a downstram data link 538 and a MAC layer link 540. The MUX transmit system 508 is connected with the DSM 544 by an upstream data link 516 and a MAC layer link 518. The DNE 546 is connected to the DSM 544.

The subscriber unit system 400 can be either fixed or portable which provides the user with greater freedom and flexibility to change locations within a coverage area. The base station systems 500 are placed strategically to direct radiant energy to cells within a coverage area. The base station systems 500 are designed to only use frequencies within its coverage area. This configuration allows the reuse of frequencies throughout the entire system. Those skilled in the art will appreciate the use of repeaters to fill holes where wireless communications do not exist and increase signal strength where wireless signals are weak. The use of repeaters will improve the coverage of wireless communications.

Figure 6:
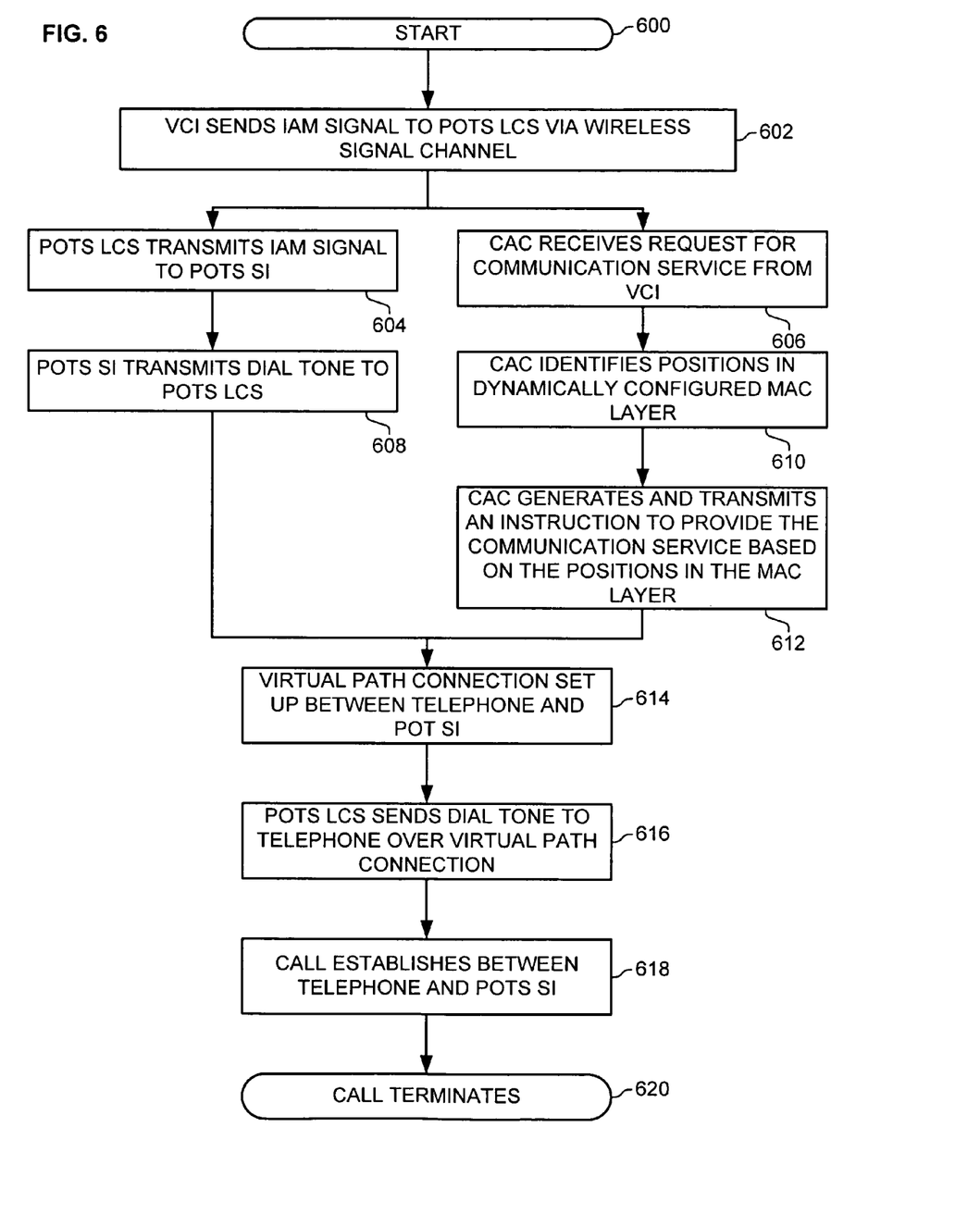
FIG. 6 is a flow diagram of a subscriber call request in an example of the invention.

FIG. 6 depicts a flow chart for a subscriber calling in the broadband wireless access system. FIG. 6 begins at step 600. In step 602, the subscriber picks up the telephone 402 and the telephone 402 goes off hook. The VCI 406 sends an Initial Address Message (IAM) signal to the POTS LCS 514 through an upstream signaling connection. The upstream signaling connection is comprised of the upstream signal link 430, the MUX transmit system 440, the QPSK modem 442, the RF transmitter 444, the antenna 446, a wireless signaling channel, the antenna 526, the RF receiver 528, the 64 QAM modem 530, the MUX receive system 532, and the downstream signal link 536.

In step 604, the POTS LCS 514 transmits the IAM signal to the POTS SI 524. In response to receiving the IAM signal, the POTS SI 524 then responds with a dial tone to the POTS LCS 514 in step 608. While the IAM signal is transmitted to the POTS SI 524, the CAC 522 receives a request for the voice communication service from the POTS LCS 514 in step 606. In step 610, the CAC 522 then identifies positions in the dynamically configured MAC layer for an upstream voice communication and a downstream voice communication. In step 612, the CAC 522 generates and transmits an instruction to the POTS LCS 514 to provide the requested voice communication based on the positions in the MAC layer. The POTS LCS 514 transmits the instruction to the MUX transmit system 508 and 440 and the MUX receive system 412 and 532 to coordinate the provision of the voice communication service in the dynamically configured MAC layer. Steps 606 and 610 are discussed in detail in FIGS. 8-9 below.

In step 614, a virtual connection path for the call is set up between the telephone 402 and the POTS SI 524 based on the positions in the MAC layer for upstream and downstream voice communications. The virtual connection path is comprised of a downstream virtual connection and an upstream virtual connection. The downstream virtual connection is established between the telephone 402 and the POTS SI 524 for transmission from the base station system 500 to the subscriber unit system 400 via the POTS LCS system 514, the upstream voice link 510, the MUX transmit system 508, the 64 QAM modem 506, the RF transmitter 504, the antenna 502, the antenna 418, the RF Receiver 416, the 64 QAM modem 414, the MUX receive system 412, the downstream voice link 410, and the VCI 406. The upstream virtual connection is established for transmission from the subscriber unit system 400 to the base station system 500 via the VCI 406, the upstream voice link 428, the MUX transmit system 440, the QPSK modem 442, the RF transmitter 444, the antenna 446, the antenna 526, the RF receiver 528, the 64 QAM modem 530, the MUX receive system 532, the downstream voice link 534, and the POTS LCS 514.

After the virtual path connection is set up and the POTS LCS 514 receives the dial tone from the POTS SI 524, the dial tone is transmitted to the telephone 402 over the transmitting virtual connection in step 616. The subscriber then dials a telephone number. The VCI 406 converts the phone number to digits and sends the digits through the upstream signaling connection to the POTS LCS 514. The POTS LCS 514 then transmits the digits to the POTS SI 524 to complete the call. Once the call is completed to the dialed number, the call is transmitted and received 628 through the virtual connection path between the telephone 402 and the POTS SI 524 in step 618. Once the call is terminated, the virtual path connection and wireless capacity tears down 630 in reverse order in step 620.

Those skilled in the art will appreciate that the call in FIG. 6 can be voice, facsimile, modem, or any other communication over telephone lines. Those skilled in the art will also understand that an incoming call from the POTS SI 524 to the telephone 402 would use the same virtual connection path as in FIG. 6. The initial signaling for the incoming call would go to the telephone 402 via the upstream signal link 512, the MUX transmit system 508, the 64 QAM modem 506, the RF transmitter 504, the antenna 502, the antenna 418, the RF receiver 416, the 64 QAM 414, the MUX receive system 412, the signal link 408, and the VCI 406. Also, the request for the communication service for the incoming call would originate at the POTS SI 524 and be transmitted to the CAC 522 via the POTS LCS 514. Those skilled in the art will understand that steps 606, 610, and 612 would be the same for the incoming call and step 616 would not be needed.

Figure 7:
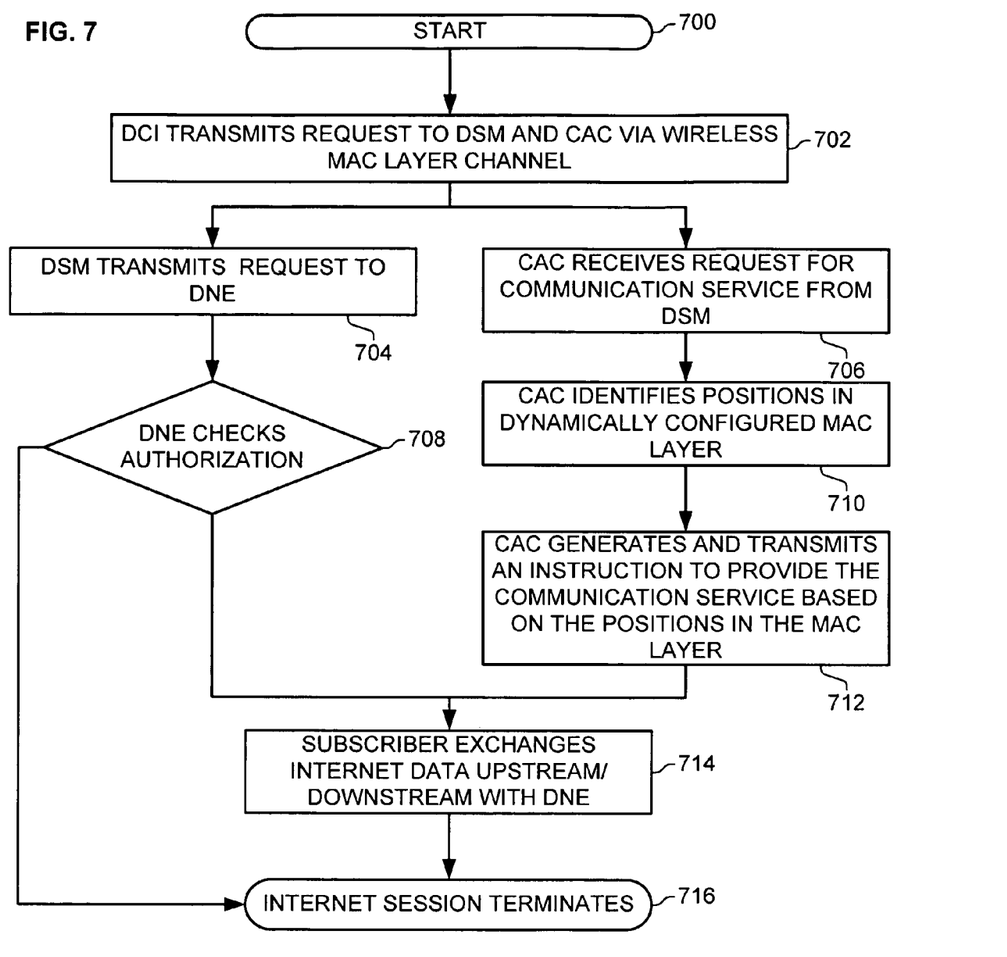
FIG. 7 is a flow diagram of a subscriber internet request in an example of the invention.

FIG. 7 depicts a flow chart for a subscriber requesting an Internet session for world wide web browsing in the broadband wireless access system. FIG. 7 begins at step 700. The subscriber requests the Internet session over a computer 420. In step 702, the DCI 426 transmits a request for the Internet session to the DSM 544 via the MAC layer link 434, the MUX transmit system 440, the QPSK modem 442, the RF transmitter 444, the antenna 446, the antenna 526, the RF receiver 528, the 64 QAM modem 530, the MUX receive system 532, and the MAC layer link 540. The DSM 544 also transmits the request for the Internet session to the CAC 522.

In step 704, the DSM 544 transmits the request for the Internet session to the DNE 546. In step 708, the DNE 546 after receipt of the request performs authentication and authorization of the Internet session. For example, the DNE 546 will check if the subscriber has a valid Internet account for web browsing or e-mail. If no authorization or authentication, the session ends at step 716. If the session is authorized and authenticated, the session continues to step 714.

In step 706, the CAC 522 receives a request for the Internet session from the DSM 544. In step 710, the CAC 522 then identifies a position in the dynamically configured MAC layer for the requested communication service. In step 712, the CAC 522 generates and transmits an instruction to the DSM 544 to provide the request communication service based on the position in the MAC layer. The DSM 544 transmits the instruction to the MUX transmit system 508 and 440 and the MUX receive system 412 and 532 to coordinate the provision of the Internet session in the dynamically configured MAC layer. Steps 706 and 710 are discussed in detail in FIGS. 8-9 below.

In step 714, an Internet session is then established after the DNE 546 performs the authorization and the DSM 544 receives the instruction to setup an Internet session. The subscriber then exchanges Internet data with the DNE 546. Internet data is sent from the computer 420 to the DNE 546 through the DCI 426, the upstream data link 436, the MUX transmit system 440, the QPSK modem 442, the RF transmitter 444, the antenna 446, the antenna 526, the RF receiver 528, the 64 QAM modem 530, the MUX receive system 532, the downstream data link 538, and the DSM 544. Internet data is sent from the DNE 546 to the computer 420 through the DSM 544, the upstream data link 516, the MUX transmit system 508, the 64 QAM modem 506, the RF transmitter 504, the antenna 502, the antenna 418, the RF receiver 416, the 64 QAM modem 414, the MUX receive system 412, the downstream data link 438, and the DCI 426. Once the subscriber terminates the Internet session, the wireless capacity tears down in reverse order in step 716.

Those skilled in the art will understand that the Internet session could include e-mail, world wide web browsing, PUSH technology, and chat rooms. Those skilled in the art will understand that the same steps in FIG. 7 could apply to other communication devices such as televisions, set top boxes, and stereos. Some examples of communication services provided to other communication devices are audio broadcast, file transfers, data transfers, network games, desktop multimedia communications, video broadcasting, and video conferencing. Those skilled in the art will appreciate that the instruction to provide the communication service that require only one way communication such as a video broadcast will only be sent to elements providing the communication service.

Figure 8:
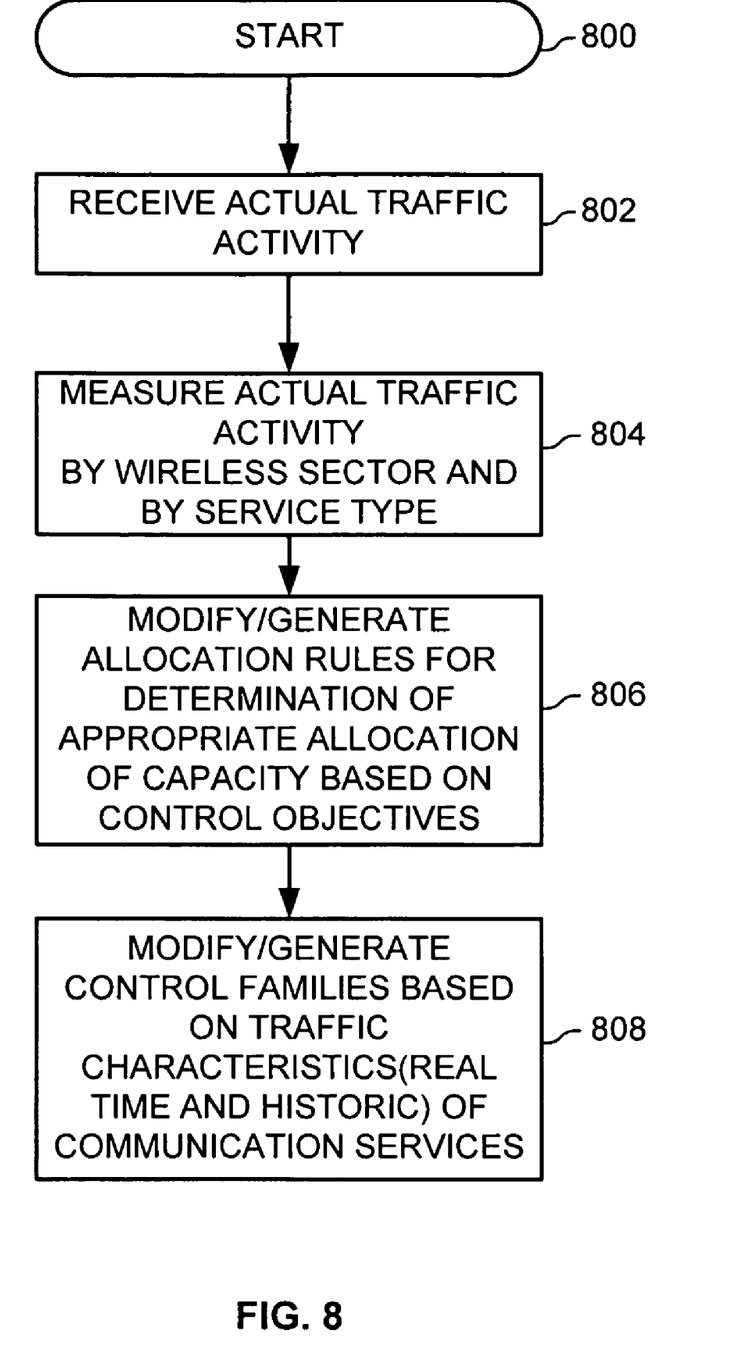
FIG. 8 depicts a flow chart for the generation or modification of allocation rules and control families in an example of the invention.

FIG. 8 depicts a flow chart for the generation or modification of allocation rules and control families in the CAC 522. The allocation rules are rules that allocate the capacity for packets within the MAC layer in a wireless link. In this embodiment of the invention, the allocation rules are fuzzy rules in a fuzzy logic system. Another embodiment of the invention uses neural networks to perform the same function as the allocation rules. The control families are groups of communication services that have similar delivery requirements. The control families are determined based on analysis and traffic patterns of actual current traffic and historical traffic in the broadband wireless access system. The steps in FIG. 8 can be executed continuously during the operation of the broadband wireless access system to monitor traffic and improve allocation rules and families.

FIG. 8 begins at step 800. In step 802, the CAC 522 receives actual traffic activity of the broadband wireless access system. In step 804, the CAC 522 measures the actual traffic activity by wireless sector and by type of communication service. In step 804, the CAC 522 modifies and/or generates allocation rules for determination of appropriate allocation of capacity in the MAC layer based on control objectives. These control objectives are (1) to maintain all traffic flowing during peak load of traffic, (2) to continually exchange high priority traffic between the communication device and the network system, (3) to reduce capacity for low priority traffic during congestion periods, and (4) to use a plausibility check to verify actual traffic usage of capacity in the MAC layer in the wireless transmission link with historical trends of traffic usage of capacity. In this fuzzy logic embodiment, the allocation rules will be used for rule inference.

In step 808, the CAC 522 modifies and/or generates control families for requested communication services. The control families are based on the delivery requirements of the communication service. Some examples of the delivery requirements are time dependency, need for real time communication, quality of service, traffic pattern, bandwidth, priority, and grade of service. The control families will be used during the fuzzification step when a communication service is requested. The control families will then be used by the rule inference step to determine the appropriate configuration of the MAC layer. Steps 802-808 are repeated to improve allocation rules and control families.

Figure 9:
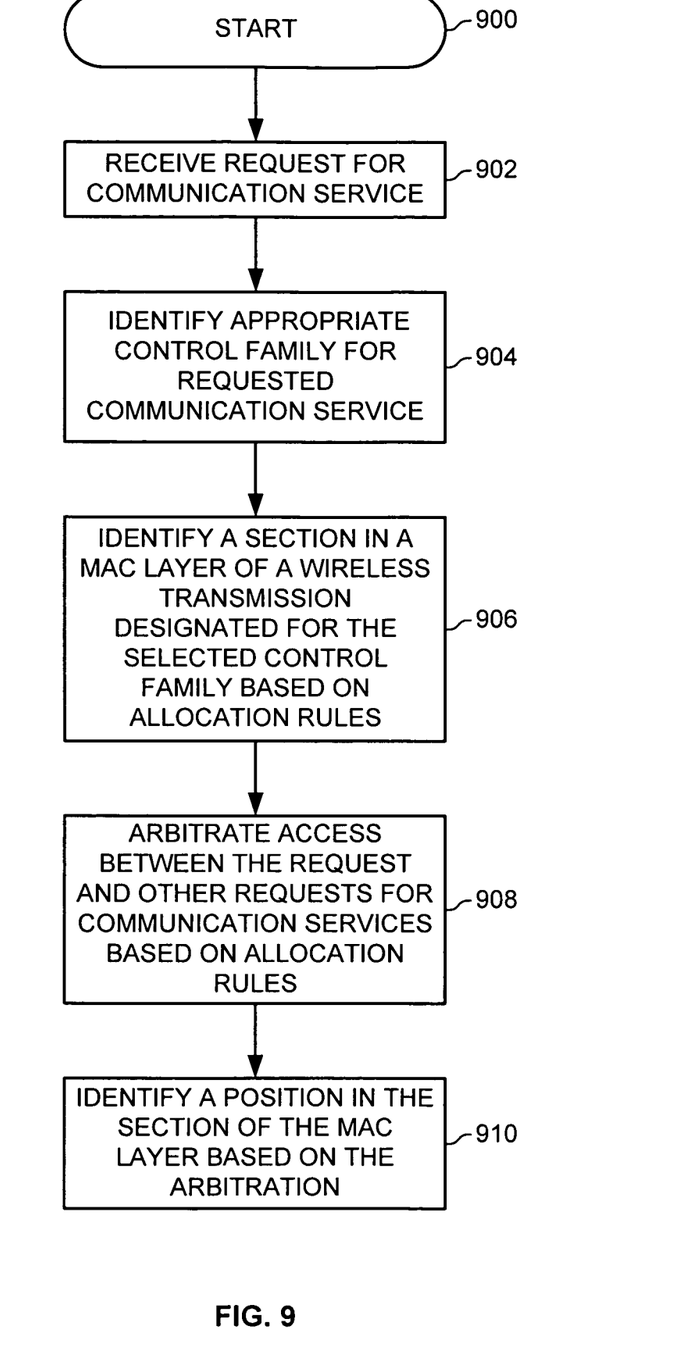
FIG. 9 depicts a flow chart for configuring the MAC layer in an example of the broadband wireless access system.

FIG. 9 depicts a flow chart for configuring the MAC layer in an example of the broadband wireless access system. FIG. 9 begins in step 900. The CAC 522 receives the request for the communication service in step 902. In step 904, the CAC 522 identifies the appropriate control family for the requested communication service based on the delivery requirements of the communication service. In this embodiment, step 902 is the fuzzification step in fuzzy logic. In step 906, the CAC 522 then identifies the section in the MAC layer of a wireless transmission for the selected control family based on the allocation rules from FIG. 8. In step 908, the CAC 522 arbitrates access within the section of the MAC layer between the requested communication service and other communication services based on the allocation rules. Steps 906 and 908 are the rule inference steps in fuzzy logic. The control families and sections in the MAC layer are some of the fuzzy values, and the allocation rules are the fuzzy rules. In step 910, the CAC 522 then identifies the position in the MAC layer based on the arbitration in step 908. Step 910 is the defuzzification process in fuzzy logic.

Those skilled in the art will appreciate variations of the above-described embodiments that fall within the scope of the invention. As a result, the invention is not limited to the specific examples and illustrations discussed above, but only by the following claims and their equivalents.

I claim:

1. A wireless communication system comprising:
   a subscriber system configured to receive from a communication device a request for a communication service and transfer the request wherein the communication service comprises one of voice communication and web browsing and having delivery requirements; and
   a base station system configured to receive the request, receive traffic information for the wireless communication system, select a frame format for packets for the requested communication service based on the delivery requirements of the requested communication service and based on the traffic information for the wireless communication system, and transfer an instruction indicating the selected frame format for the packets for the requested communication service;
   the subscriber system is further configured to receive the instruction indicating the selected frame format for the packets for the requested communication service, and in response, to exchange the packets for the requested communication service using the selected frame format with the base station system over a wireless communication link;
   the base station system is further configured to exchange the packets for the requested communication service using the selected frame format with the subscriber system over the wireless communication link, and to exchange the packets for the requested communication service with one of a telephony network system and an internet system.

2. The wireless communication system of claim 1 wherein the request for the communication service indicates a telephone number and an internet address.

3. The wireless communication system of claim 1 wherein the request for the communication service indicates a priority.

4. The wireless communication system of claim 1 wherein the request for the communication service indicates a user profile.

5. The wireless communication system of claim 1 wherein the subscriber system is portable.

6. The wireless communication system of claim 1 wherein the delivery requirements include a real-time delivery requirement.

7. The wireless communication system of claim 1 wherein the delivery requirements include a bandwidth delivery requirement.

8. The wireless communication system of claim 1 wherein the delivery requirements include a delay delivery requirement.

9. The wireless communication system of claim 1 wherein the packets comprise voice packets.

10. The wireless communication system of claim 1 wherein the telephony network system comprises a Plain Old Telephone System (POTS).

11. A method of operating a wireless communication system, the method comprising:

receiving a request for a communication service from a communication device into a subscriber system wherein the requested communication service comprises one of voice communication and web browsing and has delivery requirements;

transferring the request for the communication service from the subscriber system to a base station system;

in the base station system, receiving traffic information for the wireless communication system, selecting a frame format for packets for the requested communication service based on the delivery requirements of the requested communication service and based on the traffic information for the wireless communication system;

transferring an instruction from the base station system to the subscriber system indicating the selected frame format for the packets for the requested communication service;

in response to the instruction, exchanging the packets for the requested communication service between the subscriber system and the base station system using the selected frame format over a wireless communication link; and exchanging the packets between the base station system and one of a telephony network system and an internet system.

12. The method of claim 11 wherein the request for the communication service indicates a telephone number and an internet address.

13. The method of claim 11 wherein the request for the communication service indicates a priority.

14. The method of claim 11 wherein the request for the communication service indicates a user profile.

15. The method of claim 11 wherein the subscriber system is portable.

16. The method of claim 11 wherein the delivery requirements include a real-time delivery requirement.

17. The method of claim 11 wherein the delivery requirements include a bandwidth delivery requirement.

18. The method of claim 11 wherein the delivery requirements include a delay delivery requirement.

19. The method of claim 11 wherein the packets comprise voice packets.

20. The method of claim 11 wherein the telephony network system comprises a Plain Old Telephone System (POTS).

* * * * *